Patented Feb. 16, 1954

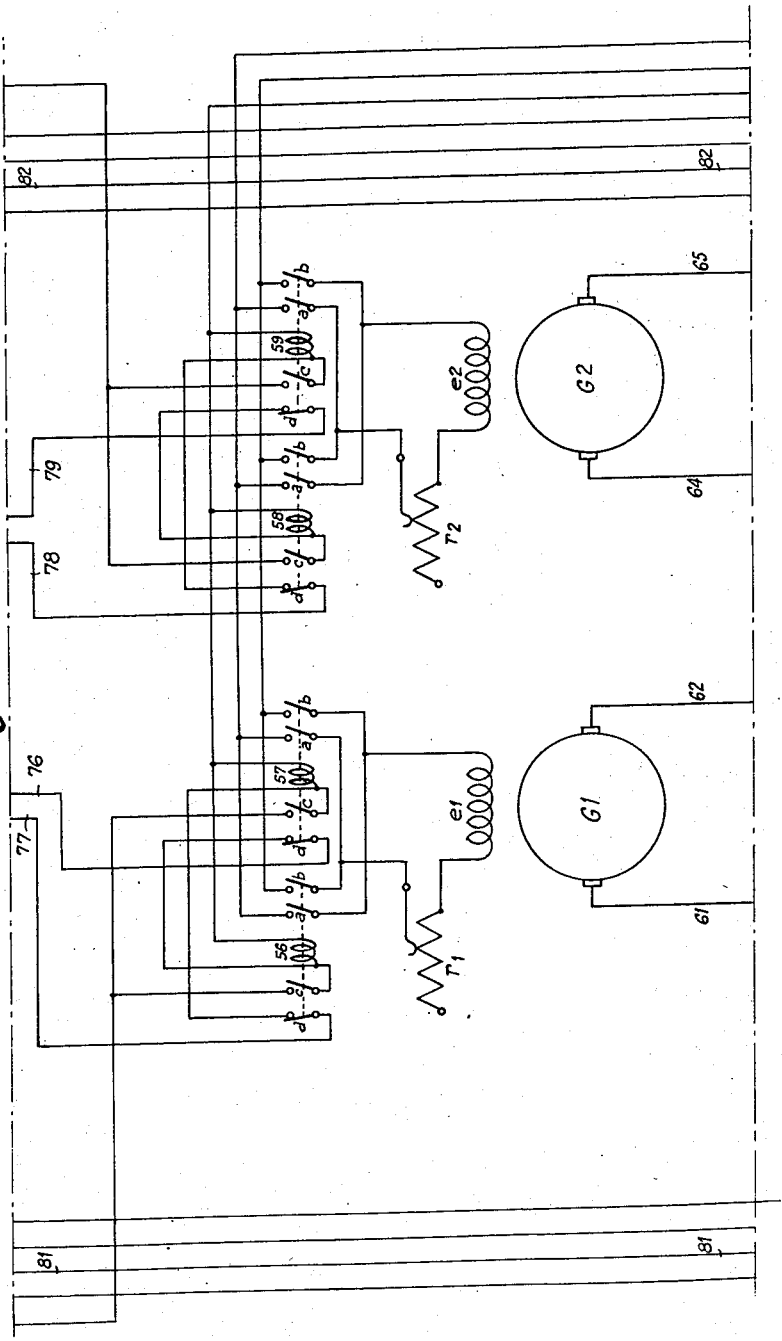

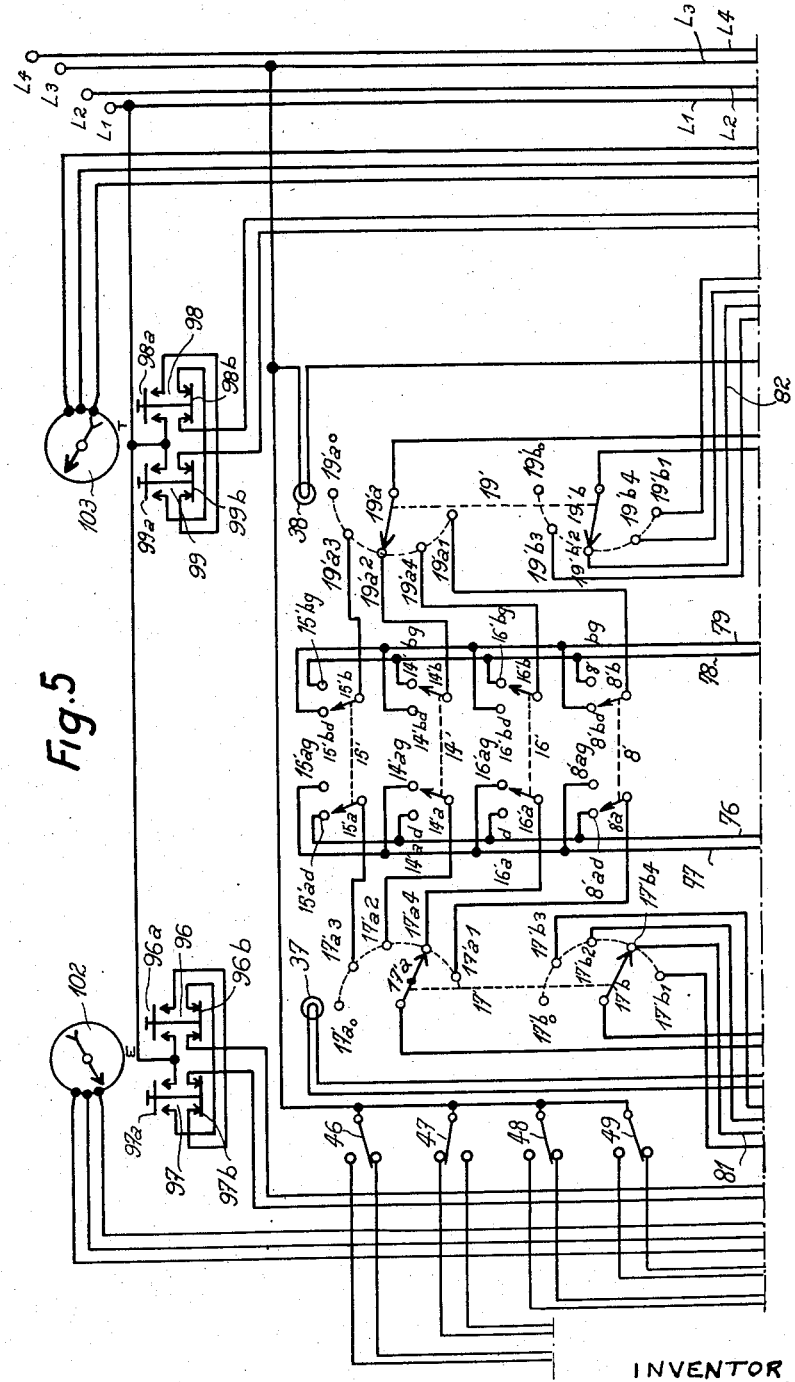

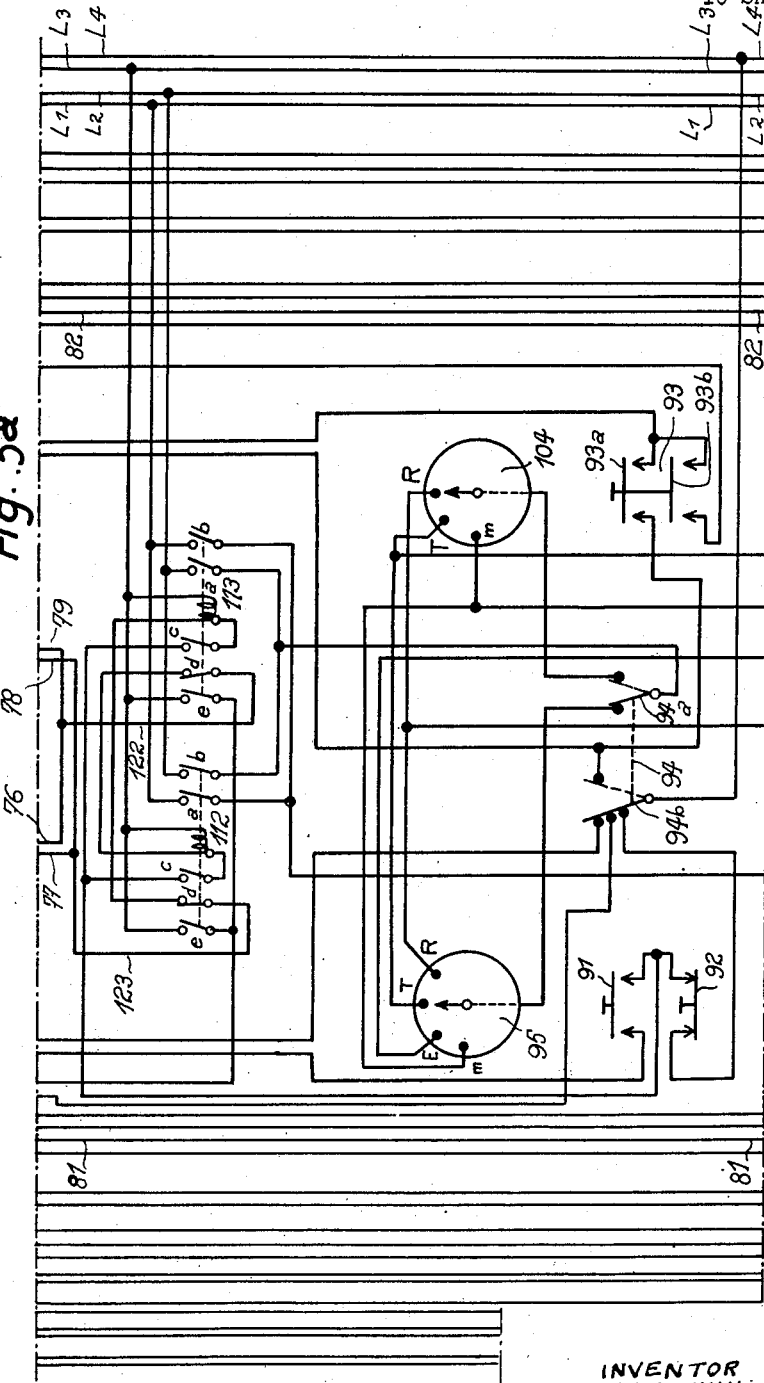

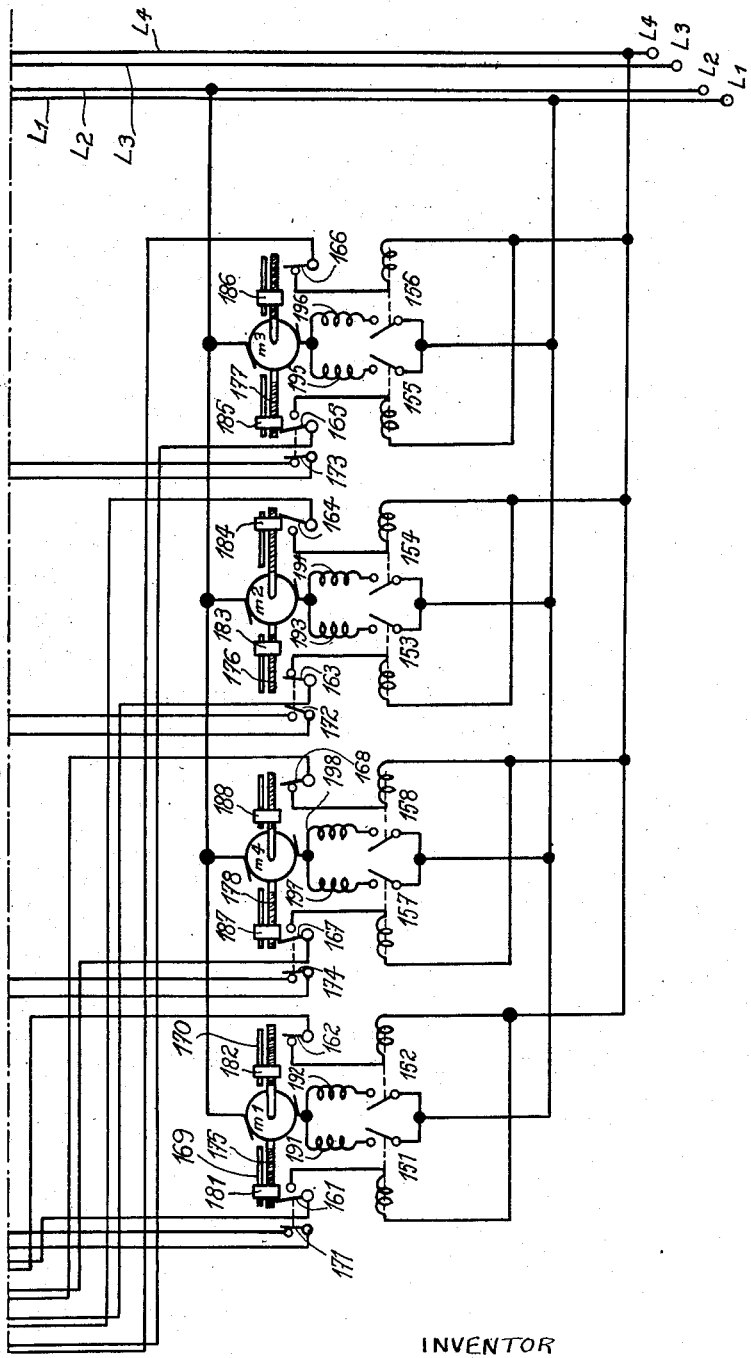

2,669,214

UNITED STATES PATENT OFFICE 2,669,214

SELECTING DEVICE FOR CONTROLLING MACHINE OR APPARATUS MEMBERS

Charles William Berthiez, Bizy Vernon, France, assignor to Societe Anonyme dite: Societe Nouvelle de Construction de Machines-Outils et d'Outillage Procedes C. W. B., Paris, France Application December 5, 1951, Serial No. 260,077

Claims priority, application France December 16, 1950

15 Claims. (Cl. 116—115.5)

In my copending application Serial No. 19,454, filed on April 7, 1948 (designated hereinafter by "main patent"), a description has been made of a device for selectively controlling a plurality of movable machine or apparatus members and which comprises at least one selecting means for selecting the movable member to be controlled and a direction-selecting means for each movable member, it being possible to effect the setting of each direction-selecting means independently of the setting of all the other direction-selecting means and also independently of the position of the member selecting means.

According to the present invention a control box as provided which may be connected to a machine tool or the like for controlling the movement of the movable members of the machine-tool or the like which comprises a panel carried exteriorly upon the box, two member-selecting elements supported adjacent the exterior face of said panel in locations which are disposed at either side of and symmetrical with respect to a substantially straight line on said panel for movement of said elements over said face to different selecting positions thereon corresponding respectively to said movable members of said machine, the number of said different selecting positions being at most equal to the number of said movable members, direction selecting means carried by said panel disposed in locations respectively identified with the several movable members of the machine and in spaced relation to each other on said straight line, said locations of said direction selecting means corresponding also to said different positions on said panel to which said member-selecting elements are respectively movable, said direction selecting means being operable for selectively controlling the direction of movement of the respective movable members selected by movement of said member-selecting elements, all said member-selecting elements and said direction selecting means being independently operable one with respect to the others, and direction indicators associated with said direction selecting means for indicating the direction of movement of the respective movable members.

The appended drawing is a diagrammatical representation, given by way of example only, of an embodiment of the invention and of a modification thereof.

In this drawing:

Fig. 1 is a front view of the main portion of a first embodiment of the selecting device according to the invention, applied to the control of a milling and boring machine and designed more particularly to control the simultaneous operation of two machine members;

Figs. 2, 2a and 2b, which are assumed to be placed one under the other according to the joining lines represented, show an example of a simplified electrical wiring diagram for the said selecting device;

Figs. 5, 5a, 5b and 5c which are assumed to be arranged one under the other according to the joining lines, show an example of a simplified electric wiring diagram for the embodiment modification.

Figure 1:
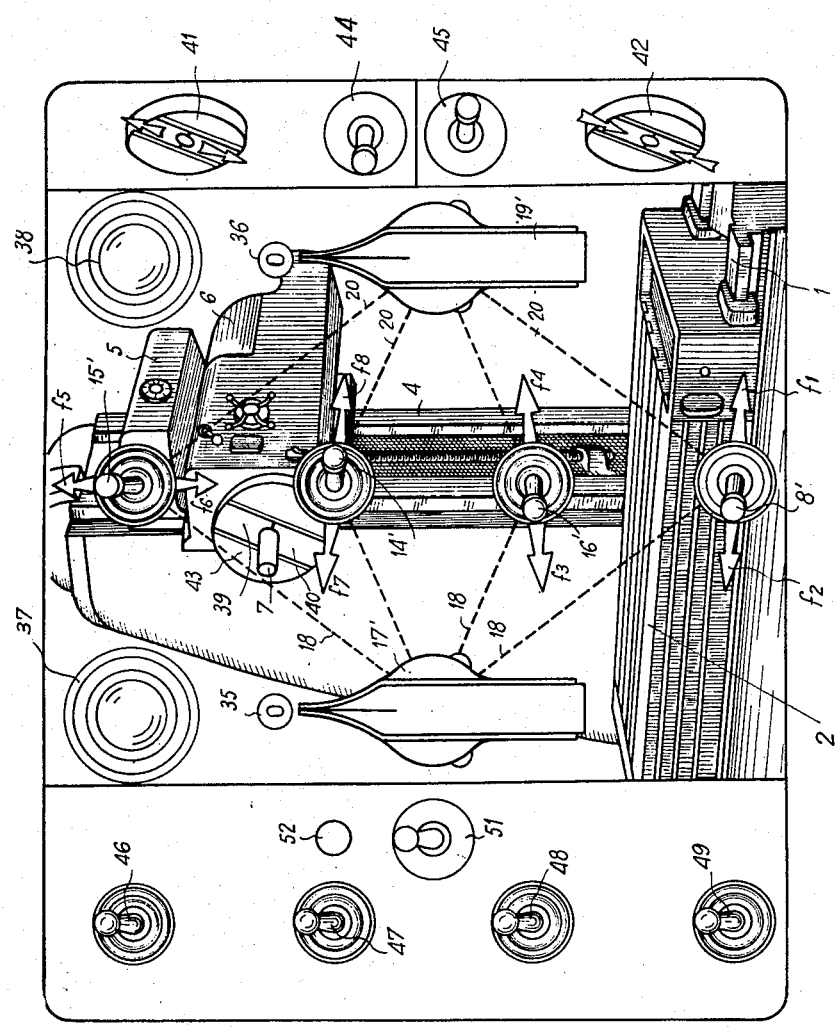

Fig. 1 is a representation of the main part of a device to select the various movable members of a milling and boring machine, this representation being in the form of a simplified pictorial representation drawn on the same lines as that shown in the main patent.

In the following statement, when speaking of machine members, the same reference numbers will be applied to them, as in the above mentioned pictorial representation. Besides, the same reference numbers as in the main patent will be used here to designate similar members: the bed 1 on which the table 2 can slide in two directions corresponding to the arrows $f1$ and $f2$; the column 4 which can be moved in the direction of the arrows $f3$ and $f4$ on a bed (not visible on the drawing); the slide 5 which moves up and down the column 4 (arrows $f5$ and $f6$); the headstock 6 which moves horizontally on its carriage 5 in the direction of the arrows $f7$ and $f8$, and, lastly, the tool carrying spindle 7 mounted in the headstock 6, the workpiece to be machined being clamped on the table 2. On the part of the pictorial representation corresponding to the table will be found a switch 8' (of the "tumbler" type in the example represented), the handle of which can be set to two different positions, viz. the position shown in the drawing, for which it is inclined in the direction of the arrow $f2$, and the opposite direction for which it would be inclined, in the direction of the arrow $f1$. These arrows $f1$ and $f2$ show the two opposite directions in which the table 2 can be moved along the bed 1.

In a similar manner, on the pictorial representation of the headstock 6, another switch 14' is provided, similar to switch 8', and the handle of which can also be set in two different positions: viz: the position shown on the drawing, in the direction of the arrow *f8*, and the opposite position in the direction of the arrow *f7*.

Two further switches 15' and 16' respectively correspond to the possible movements of the carriage 5 vertically on the column and of the column 4 longitudinally on the bed referred to above, in accordance with the direction of the respective adjacent arrows.

The four switches 8', 14', 15' and 16' allow selecting the horizontal direction of movement of the table 2 on the bed 1, the horizontal movement of the headstock 6 on its supporting carriage 5, the vertical movement of the carriage 5 along the column 4 and that the horizontal movement of the column 4 along the bed which carries it, all these members and their respective directions of movement being depicted on the panel.

On the left hand side of the pictorial representation of the machine, a member selecting element 17' has been provided, the handle of which is arrow-shaped. This element which may control a multipoint switch connected to the control system allows selecting one of the four machine members just referred to. To select one of such members, it is sufficient to turn the handle of the element 17' so that it points towards the direction selecting switch placed on the pictorial representation of the member to be moved: table, column, headstock, etc. Converging dotted lines 18 have been provided in the pictorial representation of the machine in order to better illustrate the selecting positions in which the handle 17' can be set. The number 35 is the reference number of a neutral position of element 17' which we shall also refer to hereinafter.

On the right hand side of the pictorial representation of the machine is arranged another member selecting element 19'. similar to element 17', and which, by means of a proper orientation of its handle, also allows selecting the machine member which is to be moved. Its function and its design are similar to those of switch operating element 17' and converging lines 20 play with respect to element 19' the same part as that played by lines 18 with respect to element 17'. A reference mark 36 for the neutral position is provided.

As is the case in the main patent application, the position of any one of the four direction selecting switches 8', 14', 15' and 16' is completely independent of the position of the other three switches and completely independent also of the two member selecting elements 17' and 19', the latter, in their turn, being entirely independent of one another.

It will be seen that the four switches 8', 14', 15' and 16' are arranged on a vertical line located substantially on the middle line of the figure. This arrangement clearly shows that these direction-selecting switches are used to control the direction of the movements selected by means of the two selector elements 17' and 19'.

The selecting device which has just been described may be connected with control means and a system to start and stop the selected movable member. As already stated in the main patent application, such control means may be of any type properly connected in the system.

It is possible to select a movable machine member by means of switch operating element 17' and to select another member by means of switch operating element 19', both members being operable simultaneously. Two pilot-lamps 37 and 38, placed above the switches 17' and 19' respectively, indicate, for example when they are switched on, that the corresponding machine member is in motion.

On the right hand side of the pictorial representation of the machine, Fig. 1 auxiliary pictures 41 and 42 will be found which represent a rotary surfacing plate carried by the machine headstock 6. This surfacing plate is provided with two radial symmetrical carriages 39 and 40, which can be fed away from the spindle axis (this movement is illustrated by picture 41) or towards the spindle axis (picture 42). The selection of the direction of such a movement can also be achieved by means of the same switch 14' used also to select the direction of the headstock movement, said switch 14' being, for this purpose, also placed beside the representation 43 of the surfacing plate. When the handle of said switch is set to the left, which position is indicated by the reference member 44 on the pictorial representation beneath picture 41, the two carriages move in the direction shown on picture 41 and when the handle 14' is turned to the right, which position is indicated by the reference number 45 on the pictorial representation, beneath picture 42, the two carriages move in the direction shown on picture 42, that is to say in the opposite direction. Another selector which is placed on the machine itself (and therefore not represented in the pictorial representation) allows in the usual way to move either the headstock 6 on its supporting carriage 5, or the carriages 39 and 40 on the surfacing plate 43. If it is directed to move these carriages, the selecting switch 19' (or 17') will be turned towards switch 14' which controls the direction of movement of said carriages.

Lastly, four switches 46, 47, 48 and 49, also of the "tumbler" type, have been accessorily and by way of example, placed on the left hand side of the pictorial representation, on the same level as switches 15', 14', 16', 8' respectively, for the purpose of controlling the clamping of the corresponding machine members. Any one of said switches, when in the position indicated by the reference number 51 in the pictorial representation, causes the corresponding machine member to be clamped. A large red spot (52) has been painted above the handle depicted on the pictorial representation (located at 51) to remind that when the handle of switches 46, 47, 48 or 49 is turned upwards, this corresponds to the clamping position. When the handle is turned downwards, the corresponding member is unclamped.

The neutral spots of the member selecting switches 17' and 19' have been designed merely for the sake of safety. For some machining operations, it may be indispensable to actuate only one machine member at a time. In such a case, switch 17', for example, is brought into its neutral position 35, then the member to be moved is selected by means of switch 19'. In this way, even if the operator did actuate by mistake the starting button corresponding to switch 17', there would be no accident because switch 17' being in its neutral position, no machine member would be set in motion through it.

Figure 2:
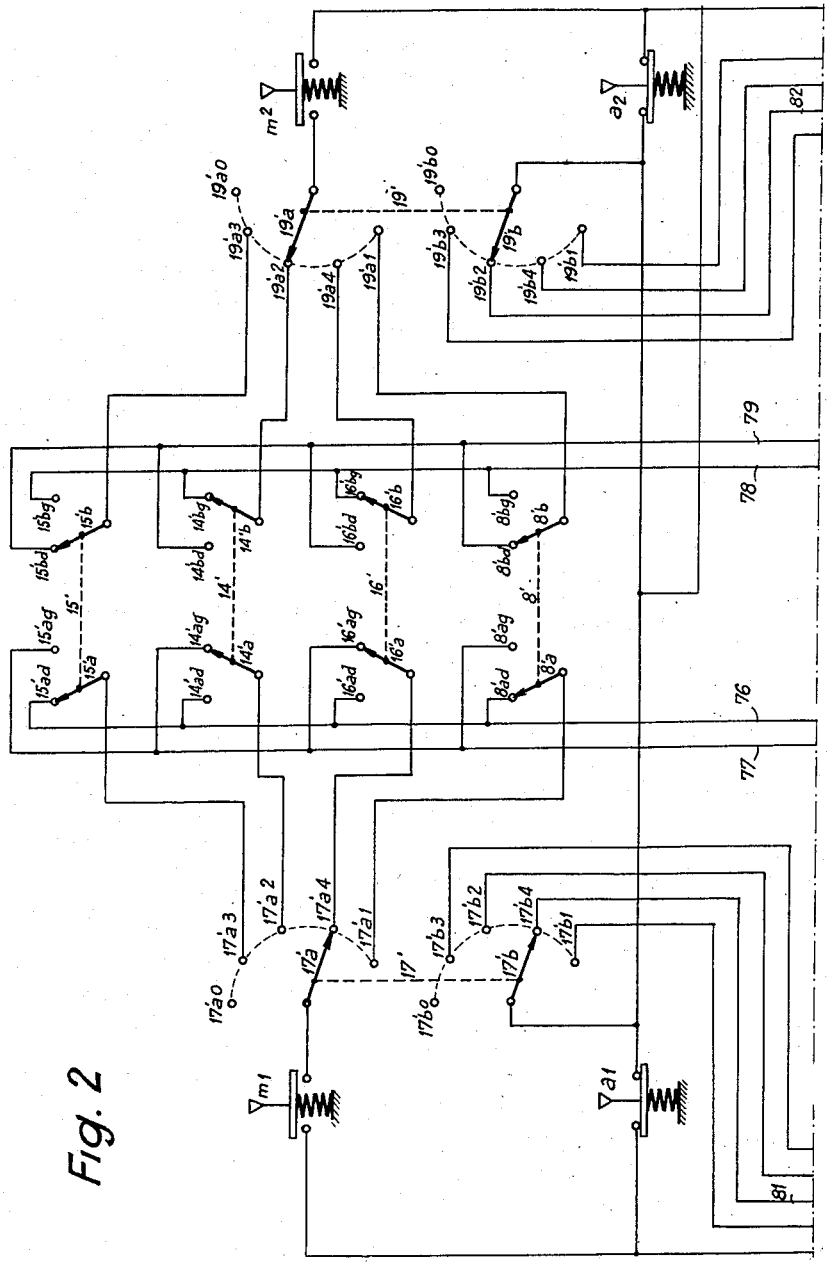
Figure 2B:
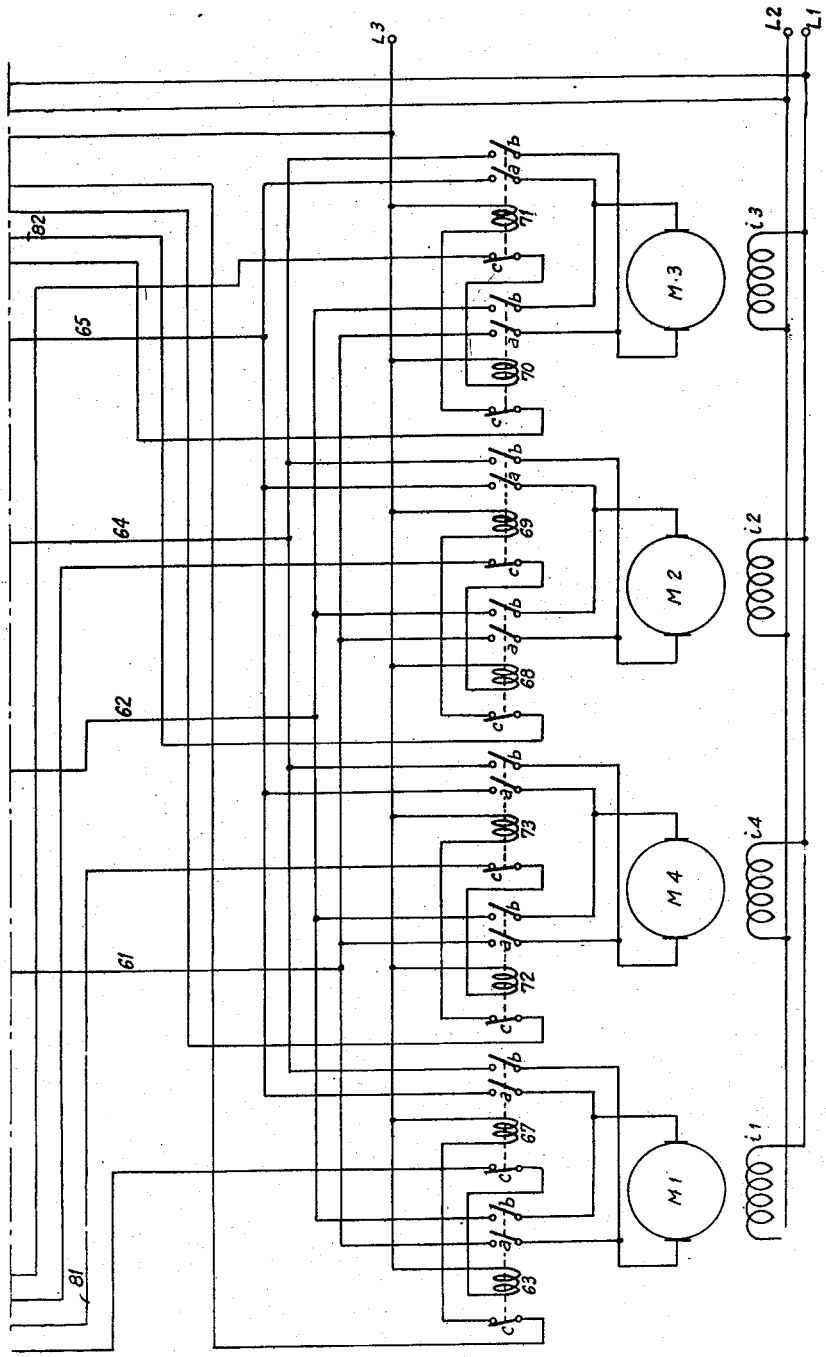

In Figures 2, 2a, 2b taken together, an example has been represented of a simplified wiring diagram showing the electrical connections of a selecting device embodying the general features described above.

In said example, it was assumed that the various machine members were to be driven by means of individual D. C. electric motors selectively fed from two separate Leonard groups. On the diagram, only the generators G1 and G2 of the two Leonard groups are represented; the excitation currents in the field windings e1 and e2 are adjusted by two rheostats r1 and r2, the current being supplied from a D. C. network connected to terminals L1—L2 of the device by means of reversing contacts 56a—56b and 57a—57b of contactors 56 and 57 for generator G1, and through reversing contacts 58a—58b and 59a—59b of contactors 58 and 59 for the generator G2. These contactors are also provided with holding contacts 56c, 57c, 58c or 59c and with interlocking contacts 56d, 57d, 58d or 59d, which we shall refer to hereunder. The supply to the coils of these contactors is ensured from a network connected to terminals L3—L4 of the device, through selecting switches, as will be seen further on.

The four motors M1, M2, M3, M4 are designed to control the movements of the table 2, the headstock 6, the carriage 5 and of the column 4 respectively. All four motors are fed in the same manner; therefore, it will be sufficient to describe the feeding circuit of one of them, motor M1, for example. The field windings i1 are energized from the D. C. network L1—L4. The armature m1 is energized either from lines 64—65 of generator G1 through the contacts 63a and 63b of a contactor 63, or from the load terminals 64—65 of generator G2 through the contacts 67a, 67b, of a contactor 67. Contactor 63 is provided with an interlocking contact 63c placed in the coil circuit of contactor 67 so as to prevent motor M1 from being connected simultaneously to both generators G1 and G2. Similarly, contactor 67 is provided with an interlocking contact 67c placed in the coil circuit of contactor 67.

The other motors M2, M3 and M4 are connected in an identical manner, by means of contactors 68—69, 70—71, 72—73 respectively. The supply to the coil of said contactors is ensured from network L3—L4 through the medium of the member selecting switches 17'—19' which will now be described in detail, by referring more particularly to Fig. 2, on which the member selecting switches occupy the same position as on Fig. 1. Switch 17' is a two-pole switch and is provided with two arms 17'a and 17'b capable of cooperating with two series of contact studs 17'a0, 17'a3, 17'a2, 17'a4, 17'a1 and 17'b0, 17'b3, 17'b2, 17'b4, 17'b1 respectively; the first stud of each series being a dead stud, whereas the others are connected to the arms 15'a, 14'a, 16'a and 8'a respectively of corresponding two-pole direction selecting switches 15', 14', 16', 8' for the studs of the first series, and to contactors 70, 68, 72, 63 which control the supply to motors M3, M2, M4, M1 to drive corresponding machine members for the studs of the other series. The member selecting switch 19' is designed in a like manner and its two arms 19'a and 19'b can be connected to the other arms 15'b, 14'b, 16'b, 8'b of the direction selectors, and to the other motor controlling contactors 71, 69, 73, 67 respectively.

The holding contacts 56c and 57c of the contactors 56 and 57 of generator G1 are fed through a "stop" contact a1 from terminal L4, and the holding contacts 58c and 59c of contactor 58 and 59 of generator G2 are fed in a like manner through a "stop" contact a2 also from terminal L4. Finally a "start" push-button makes it possible to energize contactors 56 and 57 of generator G1, by connecting their respective coils to terminal L4 through the medium of the "stop" contact a1 and of the member and direction selectors, this in a manner which will be described in detail further on. A similar push-button allows, similarly to energize the contactors 58 and 59 of generator G2.

One of the coil terminals of all the contactors which serve to set the motors running, i. e. contactors 63, 67, 68, 69, 70, 71, 72 and 73, as well as one of the coil terminals of the four excitation contactors 56, 57, 58, 59 of generators G1 and G2 is connected to the common terminal L3. Taking again motor M1 as an example, the other coil terminal of contactor 63 is connected, through an interlocking contact 67c of contactor 67 to stud 17'b1 of the member selector 17', that is to say to the stud which corresponds to the position of the switch when its handle is directed towards switch 8' corresponding to the machine table driven by motor M1. The other contactor 67 of motor M1 has its coil connected, through interlocking contact 63c of contactor 63, to stud 19'b1 of the member selector 19', that is to say to the stud corresponding to the position of switch 19' when its handle is also directed towards switch 8' located in the pictorial representation of the machine table. Thus, it can be seen that switch 17' controls the connection of the motors to line 61—62 issuing from generator G1, whereas switch 19' controls their connection to the load terminals of generator G2.

The contactors which control the other motors M2, M3, M4 are connected in a like manner to corresponding studs of the two selecting switches 17' and 19'.

It has been seen how the motors are selected and how they are fed either from one generator or from the other. Now, there remains to be seen how their rotational direction can be determined by the direction selectors 8', 14', 15', 16'. These selectors are also two-pole switches and identical with one another, switch 15', for example, includes a first arm 15'a, which is capable of cooperating with one or the other of the two studs 15'ad or 15'ag, as well as a second arm 15'b, which may cooperate with stud 15'bd or stud 15'bg. The rotational direction of the motors is determined by the polarity of the power supply to which they are connected and this polarity can be reversed at will by reversing the current in the generator field winding by means of contactors 56 and 57 for generator G1, and contactors 58 and 59 for generator G2, as seen above. For example, taking into consideration generator G1, one sees that contactor 56 is fed through interlocking contact 57d of contactor 57, by a wire 76 which can be connected through any one of the arms 8'a, 16'a, 14'a, 15'a of direction selecting switches 8', 16', 14', 15' to one of the corresponding studs 17'a1, 17'a4, 17'a3 of the member selecting switch 17', the arm 17'a of which is itself connected to terminal L4 through the "start" contact m1 and through the "stop" contact a1.

On the same generator G1, contactor 57, which controls the reverse polarity is excited from terminal L4 through the same contacts m1 and a1, the interlocking contact 56d of contactors 56 and a wire 77 which can be connected by the same arms of the direction selectors, but in the opposite position of said arms, to the same studs of member selecting switch 17'.

It would be seen that for the other generator G2, the two reversing contactors 58 and 59 can be energized from the two wires 78 and 79 respectively, through the other arms 8'b, 16'b, 14'b and 15′b of the direction selecting switches, then through arm 19′a of the other member selecting switch 19′ and, lastly, through the "start" contact m2, the "stop" contact a2 and the terminal L4.

The operation of the device just described is as follows:

Let us assume that it is desired to move simultaneously the column 4 of the machine (Fig. 1) in the direction of arrow f4, and the headstock 6 on its supporting carriage in the direction of arrow f8. The handle of the member selecting switch 17′ is turned towards the direction selecting switch 16′ placed on the pictorial representation of the column; the handle of this direction selector 16′ is brought into the position corresponding to arrow f4, then the handle 19′ of the other member selecting switch is turned towards the direction selecting switch 14′ located on the pictorial representation of the headstock, whereas the handle 14′ of the latter switch is brought into the position corresponding to arrow f8.

These selections result in the establishment of a number of circuits which can easily be traced when referring again to Figs. 2, 2a, 2b in which the selecting switches are represented precisely in the positions corresponding to the selections just made. By depressing button m1, contactor 57 of generator G1 is energized, through the following circuit: terminal L4, contact a1, contact m1, arm 17′a, stud 17′ad, arm 16′a, stud 16′ag, wire 77, "stop" contact 56d, contactor coil 57 and terminal L3. Contactor 57 is thus connected and closes its main contacts 57a, 57b, thereby also energizing field winding e1 of generator G1 from line L1—L2. The holding contact 57c is closed and the coil of contactor 57 continues to be energized even after button m1 has been released, through the following circuit: terminal L3, contactor coil 57, contact 57c, contact a1 and terminal L4.

Similarly, if button m2 is depressed, contactor 59 of generator G2 is energized through the following circuit: terminal L4, contact a2, contact m2, arm 19′a, stud 19′a2, arm 14′b, stud 14′bg, wire 78 "stop" contact 58d, coil of contactor 59 and terminal L3. Contactor 59 is then energized and closes its main contacts 59a, 59b, thus energizing the field winding a2 of generator G2 from the line L1-L2. The holding contact 59c is closed and the coil of contactor 59 continues to be energized through the following circuit: terminal L3, coil of contactor 59, contactor 59c, contact a2 and terminal L4.

Therefore, the generators of the two Leonard groups are ready to deliver power. There remains to be seen to which motors they are connected. It can be ascertained that contactor 73 of motor M4 is energized through the following circuit: terminal L3, coil of contactor 72, interlocking contact 73c of contactor 73, wire 81, stud 17′b4, arm 17′b and terminal L4.

The main contacts 72a and 72b of contactor 72 are closed and connect the motor armature to the armature of generator G1 through wires 61 and 62. The column 4 moves in the direction of arrow f4.

It can also be seen that contactor 69 of motor M2 is excited through the following circuit: terminal L3, coil of contactor 69, interlocking contact 68c of contactor 68, wire 82, stud 19′b2, arm 19′b and terminal L4. The main contacts 69a and 69b of contactor 69 are closed and connect the armature of motor M2 to that of generator G2 through wires 64 and 65. The headstock 6 moves in the direction of arrow f8.

It can be seen that the column 4 and the headstock 6 move simultaneously, each in the selected direction and at a speed which can be adjusted individually by means of excitation rheostats r1, r2 of generators G1 and G2 respectively.

It is to be noted that the selection could be achieved in the reverse way, that is to say: the handle of member selector 17′ might be turned towards the pictorial representation of the headstock, and not towards that of the column, whereas the handle of member selector 19′ could be turned towards the representation of the column and not towards that of the headstock. The same result, i. e. the simultaneous movement of the column and of the headstock would be obtained with the difference that the generators for both movements would be interchanged and that, therefore, the displacement speed of the column would be adjusted by means of the rheostat of generator G2 whereas that of the headstock would be adjusted by means of the rheostat of generator G1.

If it were desired to move other machine members, it would be sufficient to turn the handles of the member selecting switches 17′ and 19′ towards the pictorial representation of the members under consideration and to select the direction of their displacement by means of the direction selecting switches 8′, 14′, 15′, 16′, all said selecting switches being operable independently of one another.

In a like manner, if it were necessary to select, for example, the table 2 and the carriage 5, it would be possible either to select the table by means of switch 17′, and the carriage by means of switch 19′, or the table by means of switch 19′ and the carriage through switch 17′, inasmuch as, in the example represented, both switches 17′ and 19′ can select the table and the carriage.

If it is not desired to have the motors running at different speeds, they can be connected to one and the same power supply.

Lastly, it is understood that it is possible to operate only one motor at a time, by depressing only one of the two starting buttons m1 or m2.

Figure 3:
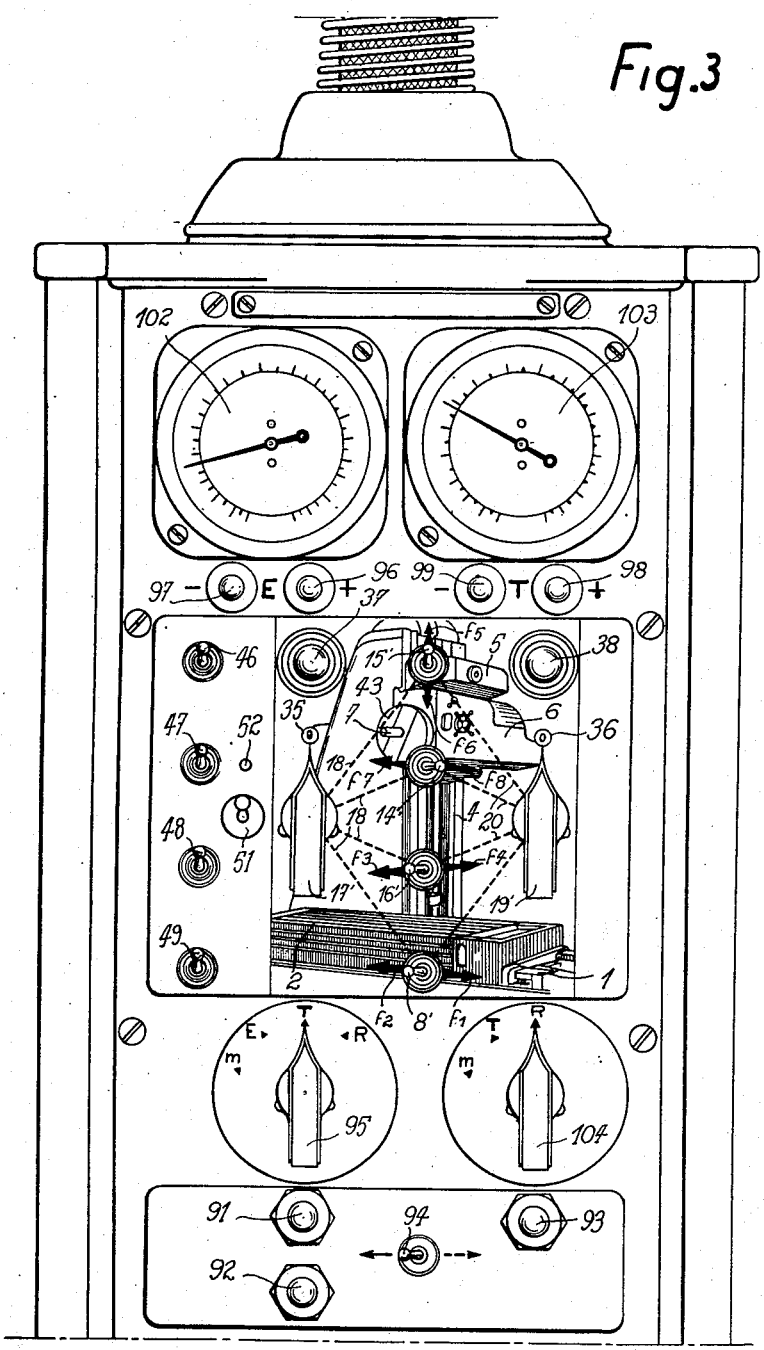
Fig. 3 is a front view of the main portion of a modification of the embodiment shown in Fig. 1 as applied to the control of a milling and boring machine and more specially intended to control the motion of a single machine member at a time, either automatically or manually.
Figure 4:
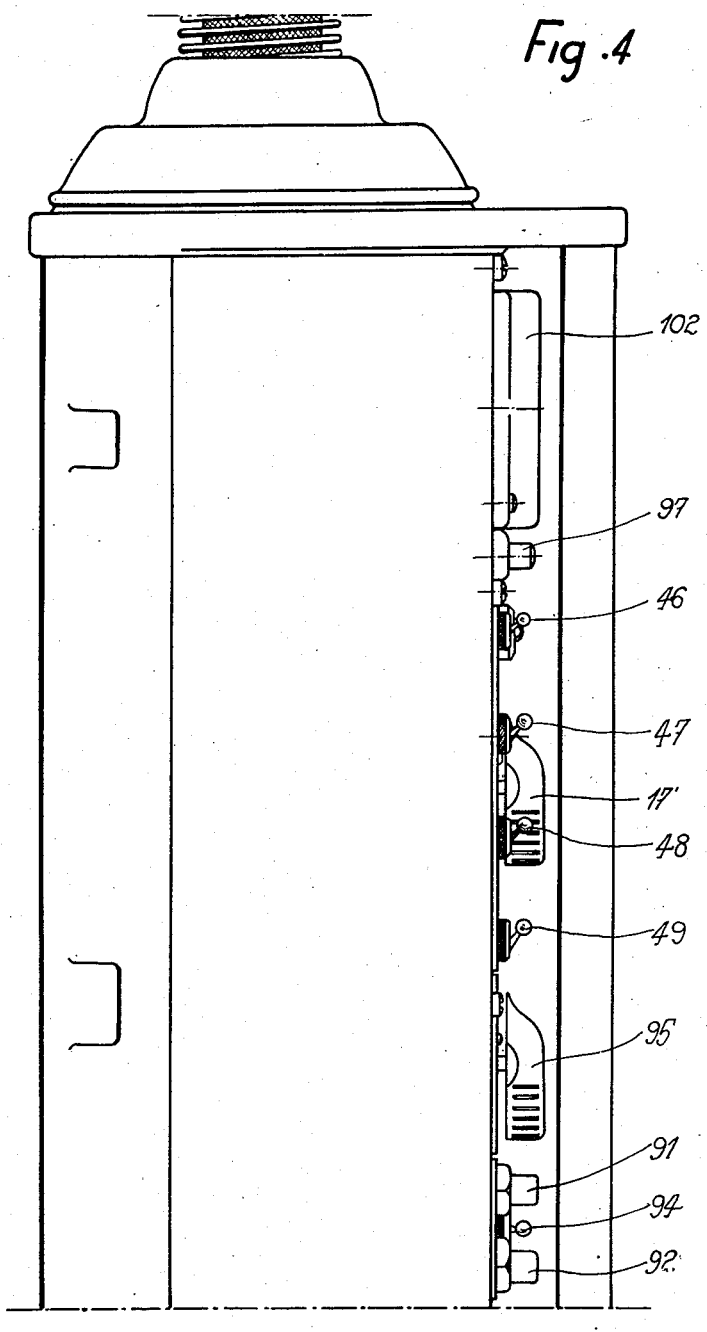
Fig. 4 is a corresponding side view.

Referring now to Figs. 3 and 4, we find the representation of a selecting device to select the various movable members of a milling and boring machine, together with a simplified pictorial representation of the said members similar to the pictorial representation placed on the embodiment shown in Fig. 1. This representation will not be described again as it will be sufficient to refer to the aforegoing statement regarding Fig. 1. As regards the embodiment represented in Figs. 3 and 4, it should, however, be specified that the machine member-selecting element 17′ is used when the machine is operated under automatic control, whereas the machine member-selecting element 19′ is used when the machine is operated under manual control.

Two push-buttons 91 and 92 are placed somewhat lower than selector element 17′ and substantially on the same vertical line. Push-button 91 is intended to set in motion the member selected by element 17′ and said member moves in the direction indicated and selected by the corresponding direction-selecting means, whereby the motion continues until the push-button 92 is depressed, this push-button being provided to stop the movements; this processus is what has been called "automatically controlled operation." Besides, in order to carry out automatic cycles, a machine member could be stopped or started by means of any known device, for instance, a device including dogs or tappets.

A single push-button 93 is placed somewhat lower than selector element 19' and substantially on the same vertical line; this button is to be used for manual control operation. By depressing this button, the member selected by element 19' is shifted in the direction selected and indicated by the corresponding direction-selecting means; the shifting goes on as long as button 93 is being depressed and it stops as soon as this button is released; this is why this condition of operation has been called "manual control operation."

Finally, a double-throw switch 94 has been provided by means of which it is possible to condition the device either for automatic or for manual operation, all according to whether its handle is pointing to the left or to the right respectively, in the drawing.

In the aforegoing, it has been purposely omitted to mention the speed of the selected shiftable machine member. Any known type of speed-varying device can be adopted. By way of example, the speed selector 95 is represented in the drawing below the selector element 17', by means of which, in the case of automatic control operation, it is possible to select a given number of speeds, namely: a quick traversing speed (marked R), a working feed (marked T), an engagement feed (marked E) and a minimum feed (marked $m$). It is obvious that selector 95 might also include a fifth position corresponding to quick reverse. The minimum feed, as well as the traversing speed have a fixed value. The engagement feed can be varied by depressing one or the other of push-buttons 96 and 97, and the working feed is varied by depressing one or the other of buttons 98 and 99. The value of the feed is increased by depressing the buttons marked "+" and it is decreased by depressing buttons marked "—." The feed increase or decrease continues as long as the corresponding button is being depressed. Indicators 102 and 103 permanently show the values of the engagement and working feeds respectively.

A speed selector 104 placed below selector element 19' is also represented, by means of which, in the case of manual control operation, three speeds only can be selected, namely: a minimum feed "$m$," a working feed "T" and a quick traversing speed "R."

Figure 5:
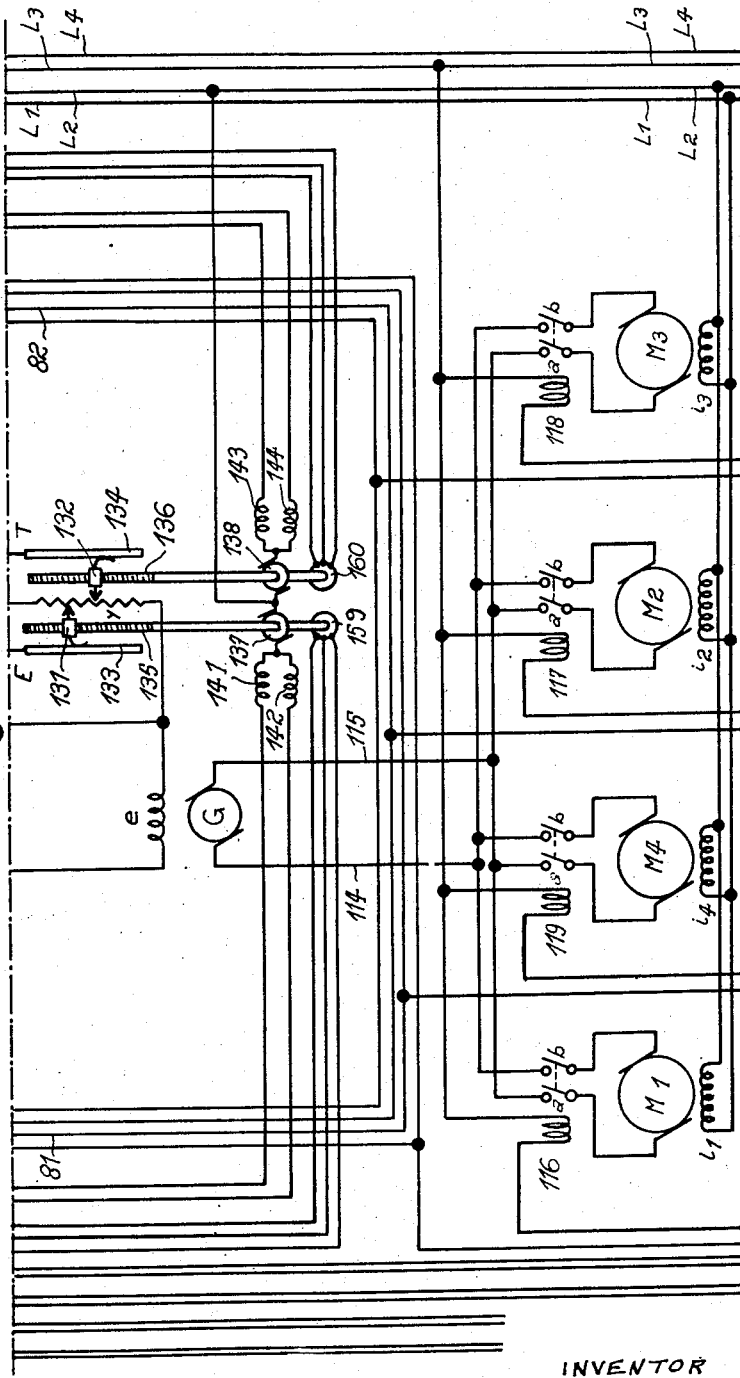

Figs. 5, 5a, 5b and 5c show an example of a simplified wiring diagram for the electrical connections of a selecting device, the main characteristics of which have just been described. In Figs. 5 and 5a of the diagram, the various elements of the selecting device are arranged in the same way as in Fig. 1. Figs. 5b and 5c relate to components which are involved in the electric circuits but which are not enclosed in the selecting device proper.

In this example, it is assumed that the various machine members are driven by means of individual electric D. C. motors M1, M2, M3, M4 energized by a Leonard group of which only the generator G is represented. The excitation current, which flows through the field winding $e$ of the generator G is supplied from a D. C. network which is connected to terminals L1 and L2 of the device and which is controlled by two contactors 112 and 113 through which the current is alternately led to the field winding $e$ in a given direction or in the opposite direction respectively so as to reverse at will the generator polarity and cause the motors M1 to M4 to run in the desired direction. These two contactors are also provided with a holding contact 112c, 113c, with an interlocking contact 112d, 113d and with a contact 112e, 113e controlling the pilot lamp 37 to which we shall revert later on. The current supply to the coil of said contactors is provided from a network connected to terminals L3, L4 of the device, particularly through the member selecting switches 17' or 19' and one of the direction selecting switches 8', 14', 15' or 16' as will be seen further on.

A rheostat $r$ comprises two sliders 131 and 132 which are in engagement, on the one hand, with a resistor $r$ and, on the other hand, with two conducting rods 133 and 134 respectively. These two sliders allow adjusting the above mentioned engagement and working feeds respectively. They cooperate with the two speed-selecting switches 95 and 104. With a view to simplifying the wiring diagram, no quick return position has been provided in switch 95. It can be seen that the minimum feed studs of the two switches 95 and 104 are connected to one end of resistor $r$, the traversing speed studs are connected to the other end of resistor $r$, the working feed studs to the conducting bar 134 and the engagement feed stud of switch 95 to conducting bar 133. Switch 104 has no engagement feed stud.

The excitation circuit of generator G also comprises a reversing contact 94a controlled by handle 94 and which allows either the speed-selecting switch 95, in the case of automatic control, or the speed-selecting switch 104 for manual control, to be operative.

The device intended to shift the sliders 131 and 132, in order to adjust the engagement and working feeds, has been, by way of example, diagrammatically represented by two driving screws 135 and 136 respectively, adapted to be rotatably driven by two small series motors 137, 138, each one of which is provided with two field windings 141—142 for motor 137 and 143—144 for motor 138, which can be respectively energized to rotate the motors in one direction or in the other. These two small motors are energized from a D. C. supply source connected to lines L1 and L2 of the device through push-button switches 98, 99 and 96, 97 respectively. Each of said push-button switches comprise a main closing contact (96a, 97a, 98a, 99a) connected in series with a back contact (97b, 96b, 99b, 98b) of the adjacent switch in order to form an electrical interlocking intended to prevent the simultaneous energization of the two opposite field windings of a motor.

The armatures of the two motors 137 and 138 are connected respectively to transmitters 159—160 of a synchronous transmission of any known type, for instance, of the Selsyn type. These transmitters are, in their turn, connected to speed indicators 102 and 103 respectively.

The four motors M1, M2, M3 and M4 are intended to drive the table 2, the headstock 6, the slide 5 and the column 4 respectively. They are all energized in the same way; therefore, it will be sufficient to describe the energization circuit of one of them, for instance, of motor M1. The field windings 11 are fed from the D. C. network L1—L2. The armature M1 is energized from output lines 114—115 of generator G through the medium of contacts 116a and 116b of a contactor 116.

The other motors M2, M3 and M4 are identically connected through the medium of contactors 117, 118, 119 respectively. The coils of said contactors are fed from a network L3—L4 through part-selecting switches 17', 19', which will now be described in detail. Switch 17' is a two-pole switch and is provided with two arms 17'a and 17'b adapted to cooperate with two rows of studs 17'a0, 17'a3, 17'a2, 17'a4, 17'a1 and 17'b0, 17'b3, 17'b2, 17'b4, 17'b1 respectively. The first stud 17'a0 or 17'b0 of each row is a dead stud. The other studs of the first row are connected respectively to the arms 15'a, 14'a, 16'a and 8'a of the corresponding direction selecting two-pole switches 15', 14', 16', 8'. The other studs of the second row are connected respectively to the contactors 118, 117, 119, 116 which control the motors M3, M2, M4, M1 which drive the corresponding machine members through the contacts 173, 172, 174, 171 respectively, to which will be reverted later on. The machine member selecting switch 19' is designed in a like manner and its two arms 19'a and 19'b may be connected to the other arms 15'b, 14'b, 16'b, 8'b of the direction selecting switches, as well as to the motor-controlling contactors 118, 117, 119, 116.

The holding contacts 112c and 113c of contactors 112 and 113 of the generator are fed (from line L4) through the stop contact 92 and the contact 94b of the reversing switch 94. Finally, the starting push-button 91 allows the contactors 112 and 113 of generator G to pull on by connecting their respective supply coils to lines L4 through the medium of contact 94b, reversing switch 94, stop contact 92 and the member and direction-selectors, and this in a manner which will be described further on.

An end of the coil of all motor-controlling contactors 116, 117, 118, 119, as well as of the two generator field energizing contactors 112, 113 of generator G is connected to the common line L3. Considering again motor M1, it will be seen that the other end of its controlling contactor 116 is connected to studs 17'b1 and 19'b1 of member-selecting switches 17' and 19' respectively, that is to say, to the studs which correspond to the position of said switches when their handles are directed towards the direction-selecting switch 8' which corresponds to the motion of the machine table driven by motor M1.

It can therefore be seen that both switches 17' and 19' control the connection of the motors to the generator output line 114—115 of generator G.

The control contactors of the other motors M2, M3 and M4 are similarly connected, that is to say, to the correspoding studs of selecting switches 17' and 19' respectively.

We have just seen how the motors are selected and how they are energized from generator G. We shall now see how their rotational direction can be determined by means of direction-selecting switches 8', 14', 15', 16'. These are also two-pole switches and are identical with one another. Switch 15' for instance, comprises a first arm 15'a adapted to cooperate with one or the other of the two studs 15'ad or 15'ag, and a second arm 15'b adapted to cooperate with a stud 15'bd or a stud 15'bg. The rotational direction of the motors is determined by the polarity of the current that energizes them, which polarity may be reversed by reversing the current in the generator field windings, by means of contactors 112 and 113, as shown above. Thus, it is clear that the contactor 112 can be energized across the interlocking contact 113d of contactor 113 through a line 122 adapted to be connected by means of wires 76 and 79 to line L4 in the following manner: wire 76 may be connected through any one of the arms 8'a, 16'a, 14'a, 15'a of direction-selecting switches 8', 16', 14', 15' to one of the corresponding studs 17'a1, 17'a4, 17'a2, 17'a3 of machine member selecting switch 17', the arm 17'a of which is connected to line L4 through contact 91 intended to start the automatic control operation, through stopping contact 92 and through contact 94b of the reversing switch 94, whereas the wire 79 may be connected, by means of any one of the arms 8'b, 16'b, 14'b, 15'b of direction selectors 8', 16', 14', 15' to one of the corresponding studs 19'a1, 19'a4, 19'a2, 19'a3 of the member-selecting switch 19' the arm 19'a of which is itself connected to line L4 through contact 95a starting the manual control operation, and through contact 94b of the reversing switch 94.

The contactor 113 controlling the reverse polarity of the generator is energized from terminal L4 across the same contacts 91, 92, 94b or 93, 94b through the medium of interlocking contact 112d of contactor 112 and of wires 123 and 77 or 78 respectively, which can be connected by means of the same direction selector arms when said arms are placed in the opposite direction, to the same studs of part-selecting switch 17' and 19'.

Fig. 5c gives a theoretical and simplified representation of a device to control the clamping of the four movable machine members, i. e. the clamping of the table on its supporting bed, of the column on its bed, of the headstock on its slide and, finally, of the headstock-supporting slide on the column. It has been assumed that the clamping of the said machine members was operated by means of any kind of device (not represented) controlled by an individual motor m4, m4, m4, m4 for each member. Therefore, the table, the column, the headstock and the slide are clamped on their support by said motors respectively when the said motors are powered in a given rotational direction, and they are unclamped when the motors are powered in the reverse direction. To simplify matters, it is assumed that these motors are series reversible D. C. motors, the two rotational directions of which are each determined by a separate winding. The connection of all four motors being identical, it will be sufficient to describe, for instance, that of motor m1. The armature of said motor is connected, on the one hand, directly to line L2 and, on the other hand, to line L1 through the medium of contactor 151 and of the field winding 191 for the rotational direction causing the unclamping of the table, or through the medium of contactor 152 and of the field winding 192 for the reverse rotational direction which, therefore, causes the clamping of said table. The coils of contactors 151 and 152 have one of their ends connected directly to line L4. The other end of said coils is connected to line L3 through limit switches 161 and 162 respectively and through the movable contact of the double-throw switch 49, according to whether its handle is placed in its lower or in its upper position. The limit switches 161 and 162 are supposedly actuated by nuts 181 and 182 respectively, which are mounted on a screw 175 rotatably connected to the rotor of motor m1, and which are rotatably immobilized by means of rods 169, 170 respectively and to which a translational motion is imparted, this translational motion being parallel to screw 175 when the latter is rotating. When the table is totally unclamped, the setting of the device is such that the nut 181 reaching the end of its travel, opens the contact 161. In a reverse way, when the table is completely clamped, the nut 182 nearing the end of its travel, closes the contact 162.

For the sake of safety, the energizing circuit of the contactors 116, 117, 118, 119 connecting the motors M1, M2, M3, M4 to generator G, is provided with a contact 171, 172, 173, 174 connected to the unclamping limit switch 161, 163, 165, 167, so that, should the operator inadvertently depress the starting push-button of any clamped machine member controlled either automatically (button 91) or manually (button 92), none of the motors controlling the motion of the various machine members can be started without the corresponding member being first unclamped.

The device just described operates in the following manner:

Let us suppose that it is desired to shift, under automatic control, the column 4 of the machine (Fig. 1) in the direction of arrow f4 and at the required speed. First of all, the reversing switch 94 is placed in the automatic control position, that is to say, it is tilted leftwards in the drawing. The handle of the machine member selecting switch 17' is directed towards the direction-selecting switch 16' located in the pictorial representation of the column; the handle of this direction-controller 16' is brought into the position corresponding to arrow f4.

Then, the handle of switch 95 is placed on the speed marked T (working feed). The value shown on indicator 103 is ascertained and, all according to whether it is lower or higher than the desired value, the button "faster" 98, or the button "slower" 99 is depressed and then released when the pointer shows that the desired value is reached. We have seen that buttons 98—99 control the energization, as well as the rotational direction of the small electric motor 138 driving the screw 136 which controls the shifting of the feed-adjusting slider 132 on the rheostat r of generator G.

The circuits established can easily be traced by referring again to Figs. 5, 5a, 5b, 5c in which the selecting switches have been represented in the position corresponding to the selections just made.

To make sure that the column is not clamped on its bed, the position of switch 48 is checked; if its handle is pointing downwards, it means that the column is unclamped and that it may be started; if, on the contrary, the handle 48 is pointing upwards, then the column is clamped on its bed and, in order to unclamp it, the handle of switch 48 must be tilted downwards. The motor m4 controlling the column-clamping device is then set running in the direction corresponding to the unclamping because in this case its controlling contactor 157 is energized through the following circuit: line L3, switch 48, closed limit switch 167, contactor coil 157, line L4. The contactor 157 being closed, the motor m4 is energized between lines L1 and L2 through contactor 157 and field winding 197. It has already been seen that, as the nut 187 is approaching the end of its travel, the unclamping contact 167 opens and, consequently, the column is clamped on its bed. At the same time, contact 174 closes and allows the energization of the contactor 119 which starts the motor M4 controlling the shifting of the column.

Finally, it must be ascertained that the other machine members, i. e., the table, headstock and slide, are properly clamped on their respective supports. Therefore, the handle of the corresponding switches 49, 47 and 46 will be tilted upwards and thereupon the corresponding clamping motors will be set running in the direction corresponding to the clamping position, until the clamping switches 162, 164 and 166 open owing to the action of nuts 182, 184, 186. The wiring diagram shows that in such a case the contacts 152, 154 and 156 would be energized.

If the button 91 is now being depressed, the contactor 113 of generator G will be energized by the following circuit: line L4, contact 94b, switch 94, contact 92, contact 91, arm 17'a, stud 17'a4, arm 16'a, stud 16'ag, lines 77 and 123, closed contact 112d, contactor coil 113, line L3. The contactor 113 picks up and closes its main contacts 113a, 113b thus energizing the field windings e of generator G from line L1—L2 through rheostat r, slider 132, rod 134, switch 95 and contact 94a of switch 94. At this stage, the pilot lamp 37 lights up since it is connected, on the one hand, to line L3 through the closed contact 113c of contactor 113 and, on the other hand, to line L4 through contact 94b of reversing switch 94. The holding contact 113c of contactor 113 closes and the contactor coil continues to be energized, even after button 91 has been released, through the following circuit: line L3, coil of contactor 113, contact 113c, lamp 37, contact 92, contact 94b of switch 94 and line L4.

The generator of the Leonard group is therefore ready to deliver power. Now, we shall see to which motor its armature is connected. It will be seen that the contactor 119 of motor M4 is energized through the following circuit: line L3, coil of contactor 119, closed contact 174, line 81, stud 17'b4, arm 17'b, contact 94b of reversing switch 94 and line L4. Contacts 119a, 119b of contactor 119 close and connect the armature of motor M4 to the armature of generator G through wires 114 and 115. The machine column 4 moves in the direction of arrow f4 at the speed which has been adjusted at the required value. It will be seen that slider 132 is actually connected in series in the excitation circuit of generator G.

If it is now desired to move under manual control a machine member such as the headstock 6 on its slide in the direction of arrow f8, this will be achieved in the following manner: First the reversing switch 94 is brought into the position "manual control operation," that is to say, it is inclined to the right hand side in the drawing, then the handle of the other member selecting switch 19' is inclined towards the direction-selecting switch 14' placed on the pictorial representation of the headstock, whereas the handle of the said direction-selecting switch is set in the position corresponding to arrow f8. The handle of switch 104 is brought into the position which corresponds to the required speed range (minimum feed, working feed, quick traverse). In the case of the working feed, the adjustment is made in the manner described for switch 95. Then, the headstock, which was clamped when the column was being shifted, must now be unclamped. To achieve this end, the handle of switch 47 is inclined downwards, thus energizing the contactor 113 which connects the motor m2 to the supply through the field winding 193 corresponding to the rotational direction of the motor which ensures the unclamping. The headstock is unclamped when the nut 183 reaches the end of its travel and opens contact 163 which cuts off the supply to the motor m2. At the same time, contact 172 closes and allows the motor M2, which controls the movement of the headstock on its slide, to be connected to the supply. The column is then clamped by bringing the handle of reversing switch 48 into its upward position so as to set the motor m4 running in the clamping direction.

By depressing the button 93 for manual control operation, the generator contactor 113 is energized through the following circuit: line L4, contact 94b of switch 94, contact 93a, arm 19'a, stud 19'a2, arm 14'b, stud 14'bg, lines 78 and 123, closed contact 112d, coil of contactor 113 and line L3. The contactor 113 picks up and closes, amongst others, its main 113a, 113b, thus energizing the field windings e of generator G from line L1—L2 through rheostat r, switch 104 and contact 94a of switch 94. Furthermore, the pilot lamp 38 lights up because it is connected, on the one hand, directly to line L3 and, on the other hand, to line L4 through contacts 93b and 93a of push-button 93 and through contact 94b of switch 94. The holding contact 113c of contactor 113 also closes, but it is isolated from line L4 due to the switch 94 being tilted to the right; therefore, the coil of the said contactor is energized only as long as button 93 is being depressed. In other words, the generator is energized only as long as button 95 is being kept depressed.

It will now be explained how the headstock-driving motor M2 is energized. We see that the contactor 117 of motor M2 is energized through the following circuit: line L3, coil of contactor 117, closed contact 172, line 82, stud 19'b2, arm 19'b, contact 94b of switch 94 and line L4. Contacts 117a, 117b of contactor 117 close and connect the armature of motor M2 to the armature of generator G through wires 114 and 115. The headstock moves at the required speed in the direction of arrow f8 as long as the starting button is being kept depressed, the generator being capable of supplying power, as explained above.

As regards the speed range selection, it will be noticed that, in the example represented, the minimum speed is obtained by inserting the whole resistance r of the rheostat in the excitation circuit of the generator, whereas for the maximum speed, this resistance is out of the circuit.

If it were desired to feed other machine members, it would be sufficient to tilt the handles of member-selecting switches 17' and 19' towards the pictorial representation of the members involved and to select the direction in which they are to be shifted by means of the direction-selecting switches 8', 14', 15', 16'; all these switches can be operated independently of one another.

It is obvious that the invention is not restricted to the embodiments described and represented, which have been quoted by way of examples only. Thus, in the wiring diagram of Figs. 2 to 2b and 5 to 5c, the member-selecting switch 17' has been represented in such a way as to be possibly connected alternately to each one of the direction-selecting switches 8', 14', 15', 16'. The same applies to the member-selecting switch 19'.

Without departing from the scope of the present invention, studs 17'a2 of switch 17', and stud 19'a4 of switch 19' could, by way of simplification, be omitted. In this case, the arm 14'a and studs 14'ad and 14'ag of switch 14', as well as the arm 16'b and studs 16'bd and 16'bg of switch 16' would become useless. With such an arrangement, the dotted line connecting, on Fig. 1, switches 17' and 14', as well as the lines connecting switches 17' and 14' would not exist, and it would not be possible to select the headstock with switch 17' and the column by means of switch 19'.

In fact, in order to achieve all the possible combinations of simultaneous displacements, it is not necessary that both member selectors should be adapted to be connected to every member to be controlled. It would evidently be possible to eliminate other connections than the two taken as examples.

It is obvious that the various movements involved in the embodiments decribed have been quoted by way of examples only and that they could be different in number; also, one or several of them might relate to other parts than those which are quoted. Thus, the table 2, for instance, could be replaced by an indexing rotary or circular milling table.

Furthermore, it is obvious that the whole selecting device might be designed for controlling and selecting other movements than feed movements, for instance, the rotational motion of a vertical-turning table driven at the cutting speed, the rotational motion of a tool-carrying spindle, etc.

It is apparent that the above mentioned arrangement applied to a control pendant box allows controlling the movements of all the machine members, including those on which indexing, circular milling and vertical-turning operations can be performed.

It is also obvious that, without departing from the scope of the present invention, other types of motor, for instance A. C. motors, could be used in the place of the D. C. motors energized by means of a Leonard group generator mentioned in the description of the embodiment chosen as an example.

What I claim is:

1. A control box for controlling the movement of the movable members of a machine-tool or the like, comprising a panel, two member-selecting elements supported adjacent the exterior face of said panel in locations at either side of and symmetrical with respect to a substantially straight line on said panel for movement of said elements over said face to different predetermined selecting positions thereon corresponding respectively to said movable members of said machine, the number of said different selecting positions being at most equal to the number of said movable members, direction selecting means carried by said panel in locations respectively identified with the several movable members of the machine and in spaced relation to each other on said straight line, said locations of said direction selecting means corresponding also to said different predetermined positions on said panel to which said member-selecting elements are respectively movable, said direction selecting means being operable to opposed positions corresponding to the directions of movement of the respective movable members selected by movement of said member-selecting elements, all said member-selecting elements and said direction selecting means being independently operable one with respect to the others, and direction indicators associated with said direction selecting means for indicating said opposed position and the direction of movement of the respective movable members.

2. A control box for controlling the movement of the movable members of a machine-tool or the like comprising a panel carrying on the exterior face thereof a pictorial representation of said machine-tool and of the movable members thereof, two member-selecting elements supported adjacent the exterior face of the panel in locations at either side of and substantially symmetrical with respect to a middle line of said pictorial representation for movement of said elements over said face to different predetermined selecting positions thereon corresponding respectively to the depictions on said panel of said movable members of said machine, the number of said different positions being at most equal to the number of said movable members, direction-selecting means carried by said panel in locations respectively associated with the depicted movable members and in spaced relation to each other on said middle line of said pictorial representation, said locations of said direction selecting means corresponding to said different predetermined selecting positions on said panel to which said member-selecting elements are respectively movable, said direction selecting means being operable to opposed positions corresponding to the directions of movement of the respective movable members selected by movement of said member-selecting elements corresponding to the depicted selected movable members, all said member-selecting elements and said direction-selecting means being independently operable one with respect to the others, and direction indicators provided on said panel in said opposed positions of said direction-selecting means for indicating the direction of movement of the respective movable members.

3. A control box as defined in claim 2 wherein at least one of said member-selecting elements is provided with a neutral position.

4. A control box as defined in claim 2 which comprises a selector part connectible with control means for automatic control operation and arranged on one side of said middle line and associated with the member-selecting element which is located on the same side thereof.

5. A control box as defined in claim 2 which comprises a selector part connectible with control means for automatic control operation and arranged on one side of said middle line and associated with the member-selecting element which is located on the same side thereof, and a second selector part connectible with a control means for manual control operation arranged on the other side of said middle line and associated with the other member-selecting element.

6. A control box as defined in claim 5 which comprises a change over selector operable to two positions and connectible with a change-over switch for making operative either said member-selecting element which is associated with said selector part for automatic-control operation or said member-selecting element which is associated with said selector part for manual control operation, said change over selector being supported on said panel adjacent said selector parts for operation of said change over selector respectively in directions toward said selector parts.

7. A control box as defined in claim 5 which comprises a "start" element and a "stop" element carried upon said panel adjacent said automatic control selector part, and a "jog" element for manual-control operation carried on said panel adjacent said second selector part consists of a "jog" switch.

8. A control box as defined in claim 2 which comprises a speed selector connectible with control means for automatic-control operation and located on the same side with respect to said middle line as a member-selecting element which is associated with said control means for automatic-control operation.

9. A control box as defined in claim 2, which comprises a speed selector connectible with control means for manual control and located on the same side with respect to said middle line as a member-selecting element which is associated with said control means for manual-control operation.

10. A control box as defined in claim 2 which comprises a speed selector connectible with control means for automatic-control operation and located on the same side with respect to said middle line as a member-selecting element which is associated with said control means for automatic-control operation, said speed selector having at least one position corresponding to an adjustable speed.

11. A control box as defined in claim 2 which comprises a speed selector connectible with control means for automatic-control operation and located on the same side with respect to said middle line as a member-selecting element which is associated with said control means for automatic-control operation, and a second speed selector connectible with control means for manual control operation and located on the same side with respect to said middle line as a member-selecting element which is associated with said control means for manual-control operation, at least one of said speed selectors having at least one position corresponding to an adjustable speed.

12. A control box as defined in claim 2 which comprises a speed selector connectible with control means for automatic control operation and located on the same side with respect to said middle line as a member-selecting element which is associated with said control means for automatic-control operation, said speed selector having at least one position corresponding to an unvariable speed.

13. A control box as defined in claim 2 which comprises a speed selector connectible with control means for automatic control operation and located on the same side with respect to said middle line as a member-selecting element which is associated with said control means for automatic-control operation, and a second speed selector connectible with control means for manual control operation and located on the same side with respect to said middle line as member-selecting element which is associated with said control means for manual-control operation, at least one of said speed selectors having at least one position corresponding to an unvariable speed.

14. A control box as defined in claim 2 which comprises a speed selector connectible with control means for automatic control operation and located on the same side with respect to said middle line as a member-selecting element which is associated with said control means for automatic-control operation, said speed selector having at least one position corresponding to an adjustable speed and a set of two switches for each adjustable speed, one of said switches being adapted for increasing the speed of the selected member and the other for decreasing the speed thereof.

15. A control box as defined in claim 2 which comprises a speed selector connectible with control means for automatic control operation and located on the same side with respect to said middle line as a member-selecting element which is associated with said control means for automatic-control operation, and a second speed selector connectible with control means for manual-control operation located on the same side with respect to said middle line as a member-selecting element which is associated with said control means for manual-control operation, at least one of said speed selectors having at least one position corresponding to an adjustable speed, and a set of two switches for each adjustable speed, one of said switches being adapted for increasing the speed of the selected member and the other for decreasing the speed thereof.

CHARLES WILLIAM BERTHIEZ.

References Cited in the file of this patent

UNITED STATES PATENTS

| Number | Name | Date |
|---|---|---|
| 2,350,174 | Lucus et al. | May 30, 1944 |
| 2,488,324 | Pegard | Nov. 15, 1949 |